(12) United States Patent
Lutz et al.

(10) Patent No.: US 8,404,787 B2
(45) Date of Patent: Mar. 26, 2013

(54) TOUGHENED EPOXY ADHESIVE COMPOSITION

(75) Inventors: Andreas Lutz, Altendorf (CH); Daniel Schneider, Au (CH)

(73) Assignee: Dow Global Technologies LLC, Midland, MI (US)

( * ) Notice: Subject to any disclaimer, the term of this patent is extended or adjusted under 35 U.S.C. 154(b) by 1002 days.

(21) Appl. No.: 11/446,037

(22) Filed: Jun. 2, 2006

(65) Prior Publication Data

US 2006/0276601 A1 Dec. 7, 2006

(30) Foreign Application Priority Data

Jun. 2, 2005 (EP) .................................. 05011908

(51) Int. Cl.
*C08F 283/04* (2006.01)
*C08F 283/10* (2006.01)

(52) U.S. Cl. ........................................ 525/528; 525/454

(58) Field of Classification Search .................. 525/528, 525/454

See application file for complete search history.

(56) References Cited

U.S. PATENT DOCUMENTS

| | | | |
|---|---|---|---|
| 3,636,133 A | | 1/1972 | Hawkins |
| 4,098,773 A * | | 7/1978 | Illers et al. ........................ 528/65 |
| 4,659,779 A | | 4/1987 | Bagga et al. |
| 4,739,019 A | | 4/1988 | Schappert et al. |
| 5,073,601 A | | 12/1991 | Mülhaupt et al. |
| 5,153,296 A | | 10/1992 | Gras et al. |
| 5,187,253 A | | 2/1993 | Wolf |
| 5,194,502 A | | 3/1993 | Saito et al. |
| 5,219,975 A | | 6/1993 | Schmalstieg et al. |
| 5,278,257 A | | 1/1994 | Mülhaupt et al. |
| 5,290,857 A | | 3/1994 | Ashida et al. |
| 5,308,895 A | | 5/1994 | Gan et al. |
| 5,686,509 A | | 11/1997 | Nakayama et al. |
| 5,824,712 A * | | 10/1998 | Willkomm et al. ............. 521/135 |
| 6,015,865 A | | 1/2000 | Blank et al. |
| 6,040,396 A | | 3/2000 | Gan et al. |
| 6,403,667 B1 * | | 6/2002 | Eleveld et al. .................. 521/174 |
| 6,548,593 B2 | | 4/2003 | Merz et al. |
| 6,762,241 B1 * | | 7/2004 | Blum et al. ..................... 524/588 |
| 6,776,869 B1 | | 8/2004 | Schenkel |
| 6,884,854 B2 | | 4/2005 | Schoenfeld et al. |
| 7,198,824 B1 * | | 4/2007 | Schwarte et al. ............ 427/407.1 |
| 2002/0114955 A1 * | | 8/2002 | Lamers et al. ................ 428/423.3 |
| 2003/0022973 A1 * | | 1/2003 | Hung et al. ..................... 524/270 |
| 2003/0192643 A1 | | 10/2003 | Schoenfeld et al. |
| 2004/0024788 A1 * | | 2/2004 | Hill et al. ........................ 707/200 |
| 2004/0039120 A1 * | | 2/2004 | Takeyama et al. .............. 525/107 |
| 2004/0157021 A1 * | | 8/2004 | Schmidt et al. ................ 428/35.7 |
| 2004/0181013 A1 | | 9/2004 | Schenkel |
| 2004/0247888 A1 * | | 12/2004 | Watanabe et al. ........... 428/423.1 |
| 2004/0266958 A1 * | | 12/2004 | Borst et al. ..................... 525/518 |
| 2005/0070634 A1 | | 3/2005 | Lutz et al. |
| 2005/0159511 A1 | | 7/2005 | Kramer |
| 2005/0209401 A1 | | 9/2005 | Lutz et al. |
| 2006/0205897 A1 | | 9/2006 | Frick et al. |

FOREIGN PATENT DOCUMENTS

| | | | |
|---|---|---|---|
| CA | 1330143 | | 6/1994 |
| CA | 2389332 | | 5/2001 |
| WO | WO0103279 | * | 5/2001 |
| WO | WO 03/054069 | | 7/2003 |
| WO | WO 2005/007766 | | 1/2005 |

OTHER PUBLICATIONS

JP63304825A, Dec. 13, 1988, Steel Master Pile for Prestressed Sheathing, Etsuro Yoshida, MicroPatent MPI Legal Status Report.
JP3319052B2, Aug. 26.2002, Fumihiko Nakumura et al., MicroPatent's Patent Index Database.
JP7042449A, Feb. 10, 1995, Bay Window and Mounting Method Thereof, Mitsuru Kosugi, MicroPatent MPI Legal Status Report.
JP2199116A, Aug. 7, 1990, Epoxy Resin Composition, Hideo Nemoto et al., MicroPatent's Patent Index Database.
JP5156227A, Jun. 22, 1993, Structural Adhesive, Kiichi Yamashita et al., MicroPatent MPI Legal Status Report.
JP2150485A, Jun. 8, 1990, Adhesive for Automobile Structure, Takahiro Nakano et al., MicroPatent MPI Legal Status Report.
WO2005007720A1, Jan. 27, 2005, Thermohardening Compositions Comprising Low-Temperature Impact Strength Modifiers, Andreas Kramer et al., MicroPatent MPI Legal Status Report.
EP1431325A1, Jun. 23, 2004, Heat-Curable Epoxy Resin Composition with Improved Low-Temperature Impact Strength, Andreas Kramer et al., MicroPatent MPI Legal Status Report.
EP0307666A1, Aug. 23, 1998, Phenol-Terminated Polyurethanes or Polyurea, and Epoxy Resins Containing These Compounds, Dr. Rolf Mülhaupt et al., MicroPatent Report.
JP04145185A, May 19, 1992, Structural Adhesive, Saito Atsushi et al., Patent Abstracts of Japan.
Database WPI Section Ch, Week, 199121, Derwent Publications Ltd., London, GB; Class A21, AN 1991-151142, XP002307834 & JP 03043481 Raytheon Co., Feb. 25, 1991-Abstract.

(Continued)

*Primary Examiner* — Mark Eashoo
*Assistant Examiner* — Megan McCulley

(57) ABSTRACT

The invention is an epoxy resin based adhesive composition comprising an epoxy resin and a compound comprising an elastomeric prepolymer residue selected from the group of a polyurethane, a polyurea and a polyurea polyurethane having isocyanate end groups, the isocyanate end groups of said prepolymer residue being capped by a capping compound selected from the group consisting of a primary aliphatic, cycloaliphatic, heteroaromatic and araliphatic amine, a secondary aliphatic, cycloaliphatic, aromatic, heteroaromatic and araliphatic amine, a thiol and an alkyl amide, said capping compound being bound to the end of the polymer chain of the elastomeric prepolymer in a manner such that the end to which it is bonded no longer has a reactive group.
In addition to the capping compound defined above above, a capping compound selected from the group consisting of a phenol and a polyphenol can be used for capping the isocyanate end groups of the prepolymer residue.

18 Claims, No Drawings

OTHER PUBLICATIONS

JP2011616A, Jan. 16, 1990, Manufacture of Composition of Butadiene-Based Copolymer and Terminal Urethane Polymer and Bridging Product Thereof, Rorufu Miyuruhauputo et al., This is a family member of EP0338985, Abstract.

* cited by examiner

TOUGHENED EPOXY ADHESIVE COMPOSITION

FIELD OF INVENTION

The present invention relates to a compound comprising an elastomeric prepolymer residue selected from the group of a polyurethane, a polyurea and a polyurea polyurethane having isocyanate end groups, the isocyanate end groups of said prepolymer residue being capped by a capping compound selected from the group consisting of primary aliphatic, cycloaliphatic, heteroaromatic and araliphatic amines; secondary aliphatic, cycloaliphatic, aromatic, heteroaromatic and araliphatic amines; thiols; alkyl amides and mixtures thereof; said capping compound being bound to the end of the polymer chain of the elastomeric prepolymer in a manner such that the end to which it is bonded no longer has a reactive group. The invention further relates to a storage-stable, structural adhesive comprising an epoxy resin and the compound defined above for bonding together two separate surfaces.

BACKGROUND OF INVENTION

Tougheners are agents used in curable compositions for giving an improved toughness and, thus, a higher dynamic strength to the cured product. Tougheners are particularly useful in structural adhesives. Structural adhesives are adhesives used for the assembly of the parts of a vehicle such as a car, a lorry, a bus or a train. After curing, structural adhesives have to bear both high static and high dynamic loads. Conventional structural adhesives are epoxy compositions. Cured epoxy compositions per se have a relatively high static strength (i.e. a high tensile and a high lap shear strength), but a rather poor dynamic strength (i.e. a low impact peel strength). In order to fulfill the requirements of a crash resistant structural adhesive having a high dynamic strength, a toughener is usually added to the epoxy composition.

Several epoxy adhesive compositions have been described in the state of the art. U.S. Pat. No. 6,015,865 relates to an adhesive composition comprising a liquid and a solid epoxy resin and an amino terminated polyalkylene glycol. JP-A-02150485 describes an adhesive composed of a gelatinized epoxy resin, a latent curing agent and an electrically conductive material. A portion of the epoxy resin composition comprises a urethane bond and is capped with the polyhydric derivative of Bisphenol A diglycidylether. JP-A-02199116 discloses an epoxy resin composition comprising an epoxy compound having a urethane bond and a curing agent. JP-A-05156227 discloses a structural adhesive obtained by formulating a urethane-modified epoxy resin, an acrylic rubber-modified epoxy resin and/or a polyalkylene ether-modified epoxy resin with a potential curing agent. JP-B-02749610 discloses a urethane modified epoxy resin giving flexibility to a cured product. JP-B-07042449 describes a structural adhesive comprising an epoxy resin, a curing agent, a conductive ingredient and a plasticizer. WO-A-00/20483 relates to epoxy adhesive compositions comprising a conventional rubber-modified epoxy resin and a condensation product of a carboxylic acid dianhydride with a di- or polyamine and a polyphenol or aminophenol. WO-A-01/94492 describes the condensation products of cyclic carboxylic acid anhydrides and difunctional polyamines and their use as structural constituents for epoxy adhesive compositions. WO-A-03/078163 discloses a curable adhesive comprising an epoxy based prepolymer, an acrylate terminated urethane resin and a heat-activated curing agent. EP-A-1 431 325 describes an epoxy adhesive composition comprising an epoxy adduct, a polymer of a defined formula, a thixotropic agent and a hardener. EP-A-0 307 666 discloses phenol-terminated polyurethane or polyurea compounds and epoxy resins comprising these compounds. WO-A-05/007720 relates to thermohardening compositions comprising low-temperature impact strength modifiers. U.S. Pat. No. 6,776,869 describes an adhesive comprising a polymer having at least one glass transition point of −30° C. or lower, a reaction product of a polyurethane prepolymer and a polyphenol or polyaminophenol, and an epoxy resin.

The mechanical properties of the above described epoxy adhesive compositions do generally not fully comply with the requirements of a structural adhesive having both a high static and dynamic strength.

EP-A-0 308 664 discloses an epoxy adhesive composition comprising a butadiene-acrylonitrile copolymer in combination with a polyphenol-terminated polyurethane or polyurea as a toughener. The tougheners described in EP-A-0 308 664 are known to give a good degree of toughness of the cured epoxy composition in which it is comprised. However, it does not teach how a further improvement in toughness is achievable. These tougheners are however expensive due to the limited availability of the aminophenol and polyphenol used for preparing the tougheners.

It is therefore an object of the present invention to provide a toughener for a heat-curable, storage-stable structural epoxy adhesive, said toughener being based on readily available starting materials and having excellent toughening properties.

SUMMARY OF INVENTION

The invention is y an epoxy resin based curable composition comprising an epoxy resin and a compound comprising an elastomeric prepolymer residue selected from the group of a polyurethane, a polyurea and a polyurea polyurethane having isocyanate end groups; the isocyanate end groups of said prepolymer residue being capped by a capping compound selected from the group consisting of primary aliphatic, cycloaliphatic, heteroaromatic and araliphatic amines; secondary aliphatic, cycloaliphatic, aromatic, heteroaromatic and araliphatic amines; thiols; alkyl amides and mixtures thereof; said capping compound being bound to the end of the polymer chain of the elastomeric prepolymer in a manner such that the end to which it is bonded no longer has a reactive group. In addition to the capping compound defined above, a capping compound selected from the group consisting of a phenol and a polyphenol can be used for capping the isocyanate end groups of the prepolymer residue.

In one embodiment, a mixture of the hereinbefore described capping compounds and one or more compounds selected from the group consisting of a phenol and a polyphenol may be used. The term "araliphatic amines" means the same as the term aralkylamines. As given above, the term "capped" means bound to the end of the polymer chain of the elastomeric prepolymer in a manner such that the end to which it is bonded no longer has a reactive group, i.e., the capping compound is monofunctional. Thus, the primary aliphatic amine and the secondary amine are bound to the prepolymer through a urea linkage, the thiol is bound to the prepolymer through a thiourea linkage, the alkyl amide is bound to the prepolymer through an acyl urea linkage and the phenol or the polyphenol is bound to the prepolymer through a urethane linkage. The elastomeric prepolymer is capped by a capping compound selected from the group consisting of primary aliphatic, cycloaliphatic, heteroaromatic and araliphatic amines; secondary aliphatic, cycloaliphatic, aromatic, heteroaromatic and aralphatic amines, thiols and alkyl amides. An additional capping compound selected from the group consisting of a phenol and a polyphenol can be used for capping the isocyanate end groups of the prepolymer residue. Thus, for one and the same compound the capping compound can be a primary aliphatic, cycloaliphatic, heteroaromatic and/or aralphatic amine; a secondary aliphatic, cycloaliphatic, aromatic, heteroaromatic and/or aralphatic amine; a thiol and/or an alkyl amide as well as a mixture of these compounds, optionally in combination with a phenol and/or a polyphenol.

The addition of the compound of the present invention capped elastomeric prepolymer to a structural adhesive leads to a cured product having an improved lap shear and impact peel strength. Typically, the cured product of a structural adhesive comprising the toughener of the present invention and an epoxy resin at least partially modified with a copolymer based on a 1,3-diene and a polar, ethylenically unsaturated comonomer has a lap shear strength of more than 25 MPa and an impact peel strength of more than 30 N/mm. Structural adhesives comprising the compound defined above as a toughener have a good storage stability. The structural adhesives also show good bonding to metals with any type of hydrocarbons disposed thereon. Particularly good bonding is achieved on metals having processing oils, such as AP 167/22 oil (available from Pfinder) and ANTICORIT™ 4107S oil (available from Fuchs), disposed thereon. Such processing oils are known to a person skilled in the art.

DETAILED DESCRIPTION OF THE INVENTION

The starting materials for preparing the capped elastomeric prepolymers of the present invention are readily available and the capped elastomeric prepolymers can be prepared at low costs. Moreover, they can be prepared at lower temperatures compared to conventional tougheners. In general, the number average molecular weight of the compounds of the present invention ranges from 10,000 to 45,000 Da. Preferably, the number average molecular weight of the compound ranges from 15,000 to 40,000 Da, most preferably from 20,000 to 35,000 Da.

Preferably, the capped elastomeric prepolymer has the structure of Formula I

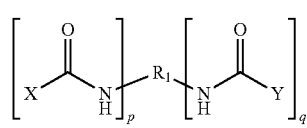

wherein $R_1$ is the elastomeric prepolymer residue, said residue having a valence of p+q=2 to 6 with p=1 to 6 and q=0 to 5, X is the residue of the primary aliphatic, cycloaliphatic, heteroaromatic and/or aralphatic amine and/or the secondary aliphatic, cycloaliphatic, aromatic, heteroaromatic and/or aralphatic amine, the thiol and/or the alkyl amide and Y is the residue of the phenol and/or the polyphenol, said compound being soluble or dispersible in an epoxy resin.

In a preferred embodiment, X is $NR_2R_3$ and/or $SR_4$, $R_2$ and $R_3$ are selected from hydrogen, a straight or branched $C_3$ to $C_{26}$ aliphatic or $C_5$ to $C_{26}$ cycloaliphatic residue, a $C_2$ to $C_{26}$ alkyl carboxy residue and an aromatic or heteroaromatic residue and optionally form together a heterocyclic, aliphatic or aromatic ring, whereby $R_2$ and $R_3$ are not both at the same time hydrogen or alkyl carboxy and $R_4$ is selected from a straight or branched aliphatic residue, a cycloaliphatic residue, an aralphatic residue and an aromatic residue.

Thus, each of $R_2$, $R_3$ and $R_4$ may be a straight $C_3$ to $C_{26}$ aliphatic residue, such as a butyl, propyl or tridecyl residue, or a branched aliphatic residue, such as an isopropyl residue. $R_2$, $R_3$ and $R_4$ may also be a cycloaliphatic residue, such as a cyclohexyl residue, or an aromatic residue, such as a phenyl or benzyl residue, or a heteroaromatic residue, such as pyrrol. Optionally, $R_2$ and $R_3$ may form a ring as in the compounds of Formula I in which X is a heterocyclic secondary amine, such as morpholine or N-alkylpiperidine or imidazol having an active hydrogen atom.

In a more preferred embodiment, $NR_2R_3$ is a secondary sterically hindered amine residue, at least one of $R_2$ and $R_3$ being of Formula II

wherein at least $R_5$ and $R_6$ are independently a $C_1$ to $C_{21}$ aliphatic residue, $R_5$ and $R_6$ may optionally form a ring and $R_7$ may be hydrogen.

It is preferred that the elastomeric prepolymer is obtainable by reacting a polyether polyol and/or a polyether polyamine with an excess of polyisocyanate. It is further preferred that during the reaction to obtain the elastomeric prepolymer additionally a polyester diol, a polybutadiene diol and/or a short-chain polyol is co-reacted.

Preferably, the number of carbon atoms of the capping compound is in the range of 4 to 22. In a particularly preferred embodiment, the secondary amine is dicyclohexylamine and/or diisopropylamine. The thiol is preferably 1-dodecanethiol. The toughening effect of these compounds is generally such that the lap shear strength of the cured product is at least 25 MPa and the impact peel strength is higher than 45 N/mm.

It is preferred that in the compound of Formula I is greater than 0. In such an embodiment, the compound of the present invention is thus also capped with a phenol and/or a polyphenol. The term "a phenol and/or a polyphenol" encompasses any compound having a hydroxyl moiety bonded to an aromatic ring structure, wherein the ring structure can have one or more aromatic rings in the structure and may be further substituted with other substituents. Examples of phenols include aminophenols and phenols substituted with an aliphatic residue like allylphenol. It is preferable that the phenol or the polyphenol is o-allylphenol, bisphenol A and/or o,o'-diallylbisphenol A.

The capped elastomeric prepolymer, such as compound defined above, is generally prepared by a process which comprises a) reacting a polyether polyol and/or a polyether polyamine with a polyisocyanate in the presence of a catalyst and b) reacting the product of a) with a primary aliphatic, cycloaliphatic, heteroaromatic and/or aralphatic amine; a secondary aliphatic, cycloaliphatic, aromatic, heteroaromatic and/or aralphatic amine; a thiol; an alkyl amide and mixtures thereof and optionally in step c) with a phenol and/or a polyphenol.

Any aliphatic isocyanate may be used in the invention which reacts with the polyols described herein and which gives the capped elastomeric prepolymers and curable epoxy compositions with the properties defined herein. Examples of the preferred aliphatic polyisocyanate compound used in the process of the present invention are 1,6-diisocyanatohexane (HDI), 5-isocyanato-1-(isocyanatomethyl)-1,3,3-trimethylcyclohexane (IPDI) and 2,4,4-trimethyl-hexamethylen-1,6- diisocyanate (TMDI). A preferred aliphatic polyisocyanate compound is 1,6-diisocyanatohexane (HDI).

It is further preferred that the amount of isocyanate is such that the elastomeric prepolymers after step a) comprises about 2 to about 6 weight percent or greater, preferably about 3 weight percent or greater of free isocyanate groups based on the total weight of the reaction mixture of step a). It is preferred that the amount of isocyanate is such that the reaction mixture after step a) comprises about 6 weight-percent or less, preferably about 5 weight-percent or less of free isocyanate groups based on the total weight of the reaction mixture of step a).

Preferably, reaction step a), b) and c) are carried out at a temperature between about 40° C. and about 120° C., most preferably at a temperature of about 60° C. to about 100° C. and most preferably about 85° C. The polyetherpolyol is preferably a polytetrahydrofurane (PTHF) or a polypropylene oxide (PPO).

The catalyst used for the reaction of the polyether polyol and the polyisocyanate can be any catalyst known to a person skilled in the art which catalyses the reaction of isocyanate groups with active hydrogen containing compounds. Among preferred catalysts are organotin compounds, metal alkanoates, and tertiary amines. Preferred organotin compounds useful as catalysts include alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin catalyst is preferably a dialkyltin dicarboxylate or a dialkyltin dimercaptide. The dialkyltin dicarboxylate preferably corresponds to the formula $(R^1OC(O))_2$—Sn—$(R')_2$ wherein $R^1$ is independently in each occurrence a $C_{1-20}$ alkyl. The preferred dialkyl dicarboxylates include 1,1-dimethyltin dilaurate, 1,1-dibubyltin diacetate and 1,1-dimethyl dimaleate. Another preferred class of organotin catalysts are the dialkyl tin $C_8$-$C_{18}$ carboxylates such as the dibutyl tin $C_8$-$C_{18}$ carboxylates. Metal carboxylate catalysts incluse bismuth, zinc, and zirconium carboxylates, including bismuth octoate, bismuth neodecanoate, cobalt-neodecanoate, zinc-neodecanoate and zirconium-neodecanoate. The organo tin catalyst or metal carboxylate catalyst is present in an amount of about 60 parts per million or greater based on the weight of the composition, more preferably about 120 parts by million or greater. The organo tin catalyst or metal carboxylate catalyst is present in an amount of about 1.0 percent or less based on the weight of the composition, more preferably about 0.5 percent by weight or less and most preferably about 0.1 percent by weight or less. Preferred tertiary amine catalysts include, dimorpholinodialkyl ether, a di((dialkylmorpholino)alkyl)ether, bis-(2-dimethylaminoethyl)ether, trietylene diamine, pentamethyidiethylene triamine, N,N-dimethylcyclohexylamine, N,N-dimethyl piperazine, 4-methoxyethyl morpholine, N-methylmorpholine, N-ethyl morpholine and mixtures thereof. A preferred dimorpholinodialkyl ether is dimorpholinodiethyl ether. A preferred di((dialkylmorpholino)alkyl) ether is (di-(2-(3,5-dimethyl-morpholino)ethyl)ether. Tertiary amine catalysts are preferably employed in an amount, based on the weight of the composition, of about 0.01 percent by weight or greater, more preferably about 0.05 percent by weight or greater, even more preferably about 0.1 percent by weight or greater and most preferably about 0.2 percent by weight or greater and about 2.0 percent by weight or less, more preferably about 1.75 percent by weight or less, even more preferably about 1.0 percent by weight or less and most preferably about 0.4 percent by weight or less. Preferably, the catalyst is a bismuth catalyst, such as a bismuth carboxylate (e.g. bismuth neodecanoate (NEOBI™ 200), available from Shepherd)), tin octoate, a dialkyl tin dicarboxylate, such as a dibutyltin dilaureate catalyst (e.g. METATIN™ 712) available from Acima), any dimorpholino dialkyl ether, such as 2,2'-dimorpholinodiethylether (DMDEE), a dialkyl tin mercaptide, such as a dibutyltin mercaptide catalyst (e.g. METATIN™ 713). In a preferred embodiment, the catalyst is (2,2'-dimorpholinodiethylether), a dibutyl tin mercaptide or a dibutyltin-$C_8$-$C_{18}$-carboxylate. In a particularly preferred embodiment, the catalyst is dibutyltin-mercaptide.

In a preferred process, the secondary amine reacted in step b) is dicyclohexylamine and/or diisopropylamine and the thiol reacted in step b) is preferably 1-dodecanthiol, in accordance with the preferred compounds given above. If the product of step a) or b) is also reacted with a phenol or polyphenol, the phenol or polyphenol is preferably allylphenol, bisphenol A and/or o,o'-diallylbisphenol A. In a further preferred embodiment, a polybutadiene diol and/or a polyester diol is additionally added and reacted in step a).

In order to increase the functionality of the prepolymer, a short-chain polyol, such as 1,1,1-trimethylolpropane (TMP) or pentaerythritol, can additionally be added and reacted in step a).

Preferably, the amounts of the components are such that based on the total weight of the composition
a) about 10 weight percent to about 90 weight percent of the polyether polyol more preferably about 25 to about 80 weight percent; up to about 35 weight percent of the polybutadiene diol, more preferably about 10 to about 35 weight percent; up to about 40 weight percent of the polyester polyol, more preferably about 5 to about 40 weight percent; up to about 5 weight percent of the short-chain polyol, more preferably about 0 to about 3 weight percent and about 5 weight percent to about 35 weight percent of the polyisocyanate, more preferably about 10 to about 20 weight percent are reacted in the presence of about 0.1 weight percent to about 1 weight percent of a catalyst and
b) about 2 weight percent to about 20 weight percent, more preferably about 3 to about 15 weight percent of the primary amine, the secondary amine, the thiol and/or the amide are added to the mixture obtained in a), corresponding to an amount equimolar to the isocyanate of the prepolymer if there is no reaction step b).

In an optional subsequent step c) about 0.5 weight percent to about 50 weight percent, more preferably about 1.5 to about 30 weight percent of the phenol and/or the polyphenol are added to the mixture obtained in b), corresponding to a slight molar excess with respect to the remaining isocyanate groups after step b). It is further preferred that in step a) at most about 1 weight percent, more preferably at most about 0.8 weight-percent of a short-chain polyol is added based on the total weight of the reaction mixture of step a).

As shown in the examples below, the mixture of polyols and optionally the short-chain polyol is preferably prepared before adding the polyisocyanate compound.

Epoxy resins which may be employed in the curable epoxy compositions of the invention are those which contain groups illustrated in the following formula

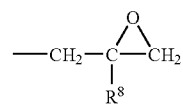

wherein $R^8$ is hydrogen or $C_{1-4}$ alkyl, preferably hydrogen or methyl and most preferably hydrogen. Preferred rigid epoxy resins are to epoxy resins having Bisphenol moieties in the backbone of the epoxy resin. Representative of preferred Bisphenol resins useful in this invention are those disclosed in U.S. Pat. No. 5,308,895 at column 8, line 6 and represented by Formula 6. Relevant portions of such patent are incorporated herein by reference. Preferably, the epoxy resin is a liquid epoxy resin or a mixture of a solid epoxy resin dispersed in a liquid epoxy resin. The most preferred rigid epoxy resins are Bisphenol-A and Bisphenol-F based resins. The epoxy resin preferably can be a liquid epoxy resin, such as D.E.R™ 330 and D.E.R.™ 331 Bisphenol A based epoxy resins (available from The Dow Chemical Company), or a solid epoxy resin, such as Bisphenol A based epoxy resin D.E.R.™ 671 (available from The Dow Chemical Company), or a mixture thereof. The epoxy resin can be a mixture of epoxy resins, such as a mixture of a liquid and a solid epoxy resin, in such a mixture preferably the amount of solid epoxy resin is about 40 precent by weight or less and more preferably about 30 percent by weight or less.

Preferably, the epoxy resin is used in an amount of 30 to 80 parts, more preferably 40 to 70 parts and most preferably 50 to 60 parts per hundred parts of the adhesive composition.

In a preferred embodiment of the epoxy composition, at least a part of the epoxy resin is modified with a copolymer based on a 1,3-diene and a polar, ethylenically unsaturated comonomer. The term "modified" means herein that the copolymer is blended with, grafted to or reacted with the epoxy resin, i.e., an adduct. Preferably, the copolymer is an adduct to the epoxy resin. Such copolymers are described in detail in U.S. Pat. No. 5,278,257 at column 2, line 11, to column 4, line 5, the disclosure of which is incorporated herein by reference. Examples of 1,3-dienes are butadiene, isoprene and chloroprene. Copolymers based on butadiene are preferred. Examples of polar, ethylenically unsaturated comonomers used in the copolymer are acrylic acid, methacrylic acid, esters of acrylic or methacrylic acid, for example, the methyl or ethyl esters, amides of acrylic or methacrylic acid, fumaric acid, itaconic acid, maleic acid or esters or half-esters thereof, for example, the monomethyl or dimethyl ester, or maleic anhydride or itaconic anhydride; vinyl ester, for example, vinyl acetate, polar styrenes, such as styrenes chlorinated or brominated in the nucleus, or, in particular, acrylonitrile or methacrylonitriles. Besides polar, ethylenically unsaturated comonomers, the copolymer can also contain other non-polar, ethylenically unsaturated comonomers. Examples of these are ethylene, propylene or, in particular, styrene or substituted styrenes, such as vinyltoluene. The copolymer can be a statistical copolymer, a block copolymer or a graft copolymer. The copolymer can be solid, in particular pulverulent, or, preferably, can be liquid. It can also be a thermoplastic, a thermoplastic elastomer or an elastomer. The proportion of the comonomers in the copolymer can vary within wide ranges. The monomers are chosen that an elastomer phase is formed in combination with an epoxide resin. These can be a homogeneous or heterogeneous system. Preferably, the epoxy resin modified with a copolymer comprises at least one of the acrylonitrile-butadiene rubbers selected from the group of X13, X8, X31 or any mixture of X8, X31 and X13 (wherein X stands for an acrylonitrile-butadiene rubber of the CTBN (carboxy-terminated butadiene-rubber type and the term "mixture" means a "mixture of two or three of the components"). X8 is an acrylonitrile-butadiene-rubber comprising 17 percent acrylonitrile. X13 is an acrylonitrile-butadiene-rubber comprising 26 percent acrylonitrile. X31 is an acrylonitrile-butadiene-rubber comprising 10 percent acrylonitrile. Preferable copolymers are carboxy terminated butadiene acrylonitrile rubbers, such as HYCAR™ CTBN 1300 X8, 1300 X13 and 1300 X31, available from Noveon.

The Curable epoxy compositions may further comprise a core shall rubber. Core-shell rubbers are known to a person skilled in the art and are for example described in U.S. Pat. No. 5,290,857 and U.S. Pat. No. 5,686,509, incorporated herein by reference as well as in EP-A-1 359 202 (paragraph [0037], (incorporated herein by reference, the disclosure of which is enclosed herewith).

A preferred storage-stable, heat-curable structural epoxy adhesive composition comprises about 5 weight percent to about 40 weight percent of the compound of the present invention, more preferably about 8 to about 30 weight percent and most preferably about 10 to about 25 weight percent. Preferably, the epoxy composition comprises about 5 weight percent or greater, and more preferably about 10 weight percent or greater of the copolymer based on a 1,3-diene and a polar ethylenically unsaturated monomer and/or of the core-shell rubber based on the weight of the epoxy composition. Preferably, the epoxy composition comprises about 30 or less, and more preferably about 20 weight percent or less of the copolymer and/or of the core-shell rubber based on the weight of the epoxy composition.

It is particularly preferred that the curable epoxy composition of the present invention comprises one or more additives selected from the group of hardeners, such as dicyandiamide and imidazoles, accelerators, such as EP 796, adhesion promoters, epoxy silane, fumed silica, wetting agents and inorganic fillers, the epoxy compositions being curable by heat. Preferably hardeners (also known as curing agents) are familiar to persons skilled in the art. Several preferred hardeners are disclosed in Lee & Neville, Handbook of Epoxy Resins (McGraw-Hill Book Co. 1967), at page 20-11 and in Tess, "Powder Coatings", Epoxy Resins—Chemistry and Technology, $2^{nd}$ Ed., at pages 776-778 (1988). Examples of preferable hardeners include dicyandiamide and other amines and amides, polyhydric phenols, and polyanhydrides. The optimum ratio of hardener to epoxy resin varies depending upon the hardener selected and the intended use of the resin. The hardener is present in a sufficient amount to fully cure the epoxy resin component. Preferably, the hardener is present in an amount of about 1 weight percent or greater and more preferably about 2 weight percent or greater based on the weight of the epoxy composition. Preferably, the hardener is present in an amount of about 10 weight percent or less and more preferably about 7 weight percent or less based on the weight of the epoxy composition.

Accelerators known to those skilled in the art may be used in this invention. Preferred classes of accelerators which may be used in this invention include amines, such as amino phenols, ureas and imidazoles. More preferred accelerators include amines, such as amino phenols. A preferred accelerator is EP 796 is 2,4,6-tris(dimethylaminomethyl)phenol integrated into a poly(p-vinylphenol) matrix as described in EP-A-0 197 892. The accelerator may be used in a sufficient amount to result in the cure of the epoxy resin component within the desired time period. Preferably, the amount of accelerator is about 0 weight percent or greater and more preferably about 0.2 weight percent or greater based on the weight of the epoxy composition. Preferably, the amount of accelerator is about 5 weight percent or less and more preferably about 2 weight percent or less based on the weight of the epoxy composition.

The capped elastomeric prepolymers can be used as toughener in Curable epoxy rein compositions which are particularly useful for structural adhesives. Accordingly, the present invention also relates to the use of the curable epoxy composition comprising the capped elastomeric prepolymers of the present invention as a structural adhesive. Likewise, the curable epoxy composition can also be a two-component epoxy adhesive composition. The curable epoxy adhesive composition is preferably used for the assembly of parts of a vehicle, such as a car, a van, a lorry, a bus and a train, i.e., as structural adhesive. It can also be used for assembling parts of boats and aircrafts. The present invention also relates to parts bonded together by the curable epoxy composition into a crash-stable assembly. The present invention also relates to the use of the two-component curable epoxy composition for bonding together parts of a vehicle into a crash-stable assembly. Preferably the curable epoxy composition of the invention is a heat curable composition.

In one embodiment the invention is a method of bonding two substrates together comprising applying a curable epoxy composition described herein to at least one surface of one substrate, the surface of a second substrate is brought together with the surface of the first substrate such that the curable epoxy composition is located between the surfaces of the substrates and the curable epoxy composition is cured. The curable epoxy composition of the present invention can be applied manually or automatically by a robot as normal beads, by swirling or by jet-streaming.

In a preferred process for bonding together two separate surfaces, the curable epoxy composition is applied to at least one surface, the surfaces are brought together and the curable epoxy composition located between the surfaces is cured at a temperature above about 120° C., preferably above about 140° C. and most preferably above 175° C. The curable epoxy adhesive is exposed to such temperatures for about 15 minutes or greater, preferably about 20 minutes or greater and most preferably 25 minutes, preferably about 60 minutes or less, more preferably about 50 minutes or less and most preferably about 35 minutes or less. Preferably, the curing is performed at about 210° C. or less, more preferably 200° C. or less and most preferably 185° C. or less. In this embodiment the adhesive composition cures after a short period of time. In such a process, the epoxy adhesive composition can be cured up to about 4 weeks after bringing together the surfaces with the adhesive located there between. In the embodiment where the composition is a two-part composition, the components are mixed just prior to applying the mixture to a substrate.

For wash-off resistant adhesive compositions, the storage-stable, heat-curable structural epoxy adhesive composition further comprises a thermoplastic polymer comprising a polyester segment, said polymer being at least partially crystalline at room temperature and having a softening temperature in the range of 40° to 125° C., more preferably from about 40 to about 90° C. Preferably, the amount of the polymer is from about 2 to about 20 weight-percent, more preferably from about 5 to about 15 weight percent based on the total weight of the adhesive composition. Such a storage-stable, heat-curable structural epoxy composition has a rather low basic viscosity and, without being pre-cured, a high wash-off resistance. Softening temperature is used herein to mean the temperature where segments of the polyester polyols start to melt in the adhesive formulation.

The number average molecular weight is determined by a standard gel permeation chromatography (GPC) method using a GPC apparatus comprising a pre-column, a first column (PL gel 3 μm MIXED E™ available from Polymer Laboratories) and a second column (PL gel 5 μm MIXED D™ available from Polymer Laboratories). The eluent of the GPC method is tetrahydrofuran (absolute puriss, over molecular sieve >99.5 percent (GC)), the flow rate being 0.9 ml/min. The detector used is an RI-detector (refractive index-detector). For calibrating the GPC apparatus, a polystyrene standard is used, the range of calibration being 160 Da to 100,000 Da. For determining the number average molecular weight of the toughener, only peaks over 2,000 Da are taken into account. In most cases, only one peak over 2,000 Da is detected. In the rare cases where only two peaks over 2,000 Da are detected, the number average molecular weight of the toughener is determined by calculating the mean of these peaks.

EXAMPLES

1. Preparation of a Dicyclohexylamine-Capped Compound According to Formula I

In reaction step a), 72.6 weight percent (based on the total weight of the resulting composition) of polytetrahydrofuran (PTHF 2000, BASF), 0.5 weight percent of 1,1,1-trimethylolpropane (TMP; Fluka) and 0.6 weight percent of bismuth neodecanoate catalyst (NEOBI 200 available from Shepherd are mixed at 85° C. to homogeneity. Then, 13.1 weight percent of hexamethylene-1,6-diisocyanate (HDI; Bayer/Merck) is added and the mixture is allowed to react at 85° C. for 1 hour. In reaction step b), 13.2 weight percent dicyclohexylamine (Merck) is added and the mixture is stirred for additional 20 minutes at 85° C. Thereby, a dicyclohexylamine-capped compound according to Formula I is obtained (Example 1).

2. Preparation of a Diisopropylamine-Capped Toughener According to Formula I

Reaction step a), 77.1 weight percent (based on the total weight of the resulting composition) of polytetrahydrofuran (PTHF 2000, BASF), 0.5 weight percent of 1,1,1-trimethylolpropane (TMP; Fluka) and 0.6 weight percent of bismuth neodecanoate catalyst (NEOBI™ 200 available from Shepherd) are mixed at 85° C. to homogeneity. Then, 14 weight percent of hexamethylene-1,6-diisocyanate (HDI; Bayer/Merck) is added and the mixture is allowed to react at 85° C. for 1 hour. In reaction step b), 7.8 weight percent of diisopropylamine (Merck) is added and the mixture is stirred for additional 20 minutes at 85° C. Thereby, a diisopropylamine-capped compound according to formula I is obtained (Example 2).

3. Preparation of a Dodecanthiol-Capped Toughener According to Formula I

In reaction step a): 71.5 weight percent (based on the total weight of the resulting composition) of polytetrahydrofuran (PTHF 2000, BASF), 0.5 weight percent of 1,1,1-trimethylolpropane (TMP; Fluka) and 0.6 weight percent of bismuth neodecanoate catalyst (NEOBI™ 200 available from Shepherd) are mixed at 85° C. to homogeneity. Then, 12.9 weight percent of hexamethylene-1,6-diisocyanate (HDI; Bayer/Merck) is added and the mixture is allowed to react at 85° C. for 1 hour. In reaction step b), 14.5 weight percent of dodecanthiol (Merck) is added and the mixture is stirred for additional 20 minutes at 85° C. Thereby, a dodecanthiol-capped compound according to Formula I is obtained (Example 3).

4. Preparation of a Compound According to Formula I Capped with Both Dicyclohexylamine (80 Val Percent) (Val Percent Means Equivalent Percent) and Allylphenol (20 Val Percent).

In reaction step a), 73.1 weight percent (based on the total weight of the resulting composition) of polytetrahydrofuran (PTHF 2000, BASF), 0.5 weight percent of 1,1,1-trimethylolpropane (TMP; Fluka) and 0.6 weight percent of bismuth neodecanoate catalyst (NEOBI™ 200 available from Shepherd) are mixed at 85° C. to homogeneity. Then, 13.2 weight percent of hexamethylene-1,6-diisocyanate (HDI; Bayer/Merck) is added and the mixture is allowed to react at 85° C. for 1 hour. In reaction step b), 10.6 weight percent of dicyclohexylamine (Merck) is added and the mixture is stirred for additional 20 minutes at 85° C. In reaction step c), 2 weight percent of o-allylphenol (Fluka) is added and the mixture is stirred for additional 20 minutes at 85° C. Thereby, a compound of Formula I capped with both dicyclohexylamine (80 val percent) and allylphenol (20 val percent) is obtained (Example 4).

5. Preparation of a Compound According to Formula I Capped with Both Diisopropylamine (80 Val Percent) and Allylphenol (20 Val Percent)

In reaction step a), 76.7 weight percent (based on the total weight of the resulting composition) of polytetrahydrofuran (PTHF 2000, BASF), 0.5 weight percent 1,1,1-trimethylolpropane (TMP; Fluka) and 0.6 weight percent of a bismuth carboxylate catalyst (NEOBI™ 200 (bismuth neodecanoate) available from Shepherd) are mixed at 85° C. to homogeneity. Then, 13.9 weight percent hexamethylene-1,6-diisocyanate (HDI; Bayer/Merck) is added and the mixture is allowed to react at 85° C. for 1 hour. In reaction step b), 6.2 weight percent diisopropylamine (Merck) is added and the mixture is stirred for additional 20 minutes at 85° C. In reaction step c), 2.1 weight percent o-allylphenol (Fluka) is added and the mixture is stirred for additional 20 minutes at 85° C. Thereby, a compound of Formula I capped with both diisopropylamine (80 val percent) and allylphenol (20 val percent) is obtained (Example 5).

6. Preparation of a Compound According to Formula I Capped with Both Dodecanthiol (80 Val Percent) and Allylphenol (20 Val Percent)

In reaction step a), 72.2 weight percent (based on the total weight of the resulting composition) of polytetrahydrofuran (PTHF™ 2000, BASF), 0.5 weight percent of 1,1,1-trimethylolpropane (TMP; Fluka) and 0.6 weight percent of bismuth neodecanoate catalyst (NEOBI™ 200 available from Shepherd) are mixed at 85° C. to homogeneity. Then, 13.1 weight percent of hexamethylene-1,6-diisocyanate (HDI; Bayer/Merck) is added and the mixture is allowed to react at 85° C. for 1 hour. In reaction step b), 11.7 weight percent of dodecanthiol (Merck) is added and the mixture is stirred for additional 20 minutes at 85° C. In reaction step c), 2 weight percent of o-allylphenol (Fluka) is added and the mixture is stirred for additional 20 minutes at 85° C. Thereby, a compound of formula I capped with both dodecanthiol (80 val percent) and allylphenol (20 val percent) is obtained (Example 6).

7. Preparation of a Diisopropylamine-Capped Compound According to Formula I Based on a Polybutadiene Diol-Containing Prepolymer In reaction step a), 52.8 weight percent (based on the total weight of the resulting composition) of polytetrahydrofuran (PTHF 2000, BASF), 24.5 weight percent of polybutadiene diol (PBD, Elf Atochem), 0.5 weight percent of 1,1,1-trimethylolpropane (TMP; Fluka) and 0.6 weight percent of a dibutyltin mercaptide catalyst (METATIN™ T-713 available from Acima, which is (8-oxa-3,5-dithia-4-stannatetradecanoic acid, 4,4-dibutyl-10) are mixed at 85° C. to homogeneity. Then, 13.7 weight percent of hexamethylene-1,6-diisocyanate (HDI; Bayer/Merck) is added and the mixture is allowed to react at 85° C. for 1 hour. In reaction step b), 7.9 weight percent of diisopropylamine (Merck) is added and the mixture is stirred for additional 20 minutes at 85° C. A diisopropylamine-capped compound according to Formula I based on a polybutadiene diol-containing prepolymer is obtained (Example 7).

8. Preparation of a Compound According to Formula I Capped with Both Diisopropylamine (80 Val Percent) and o,o'-diallylbisphenol A (20 Val Percent)

In reaction step a), 74.7 weight percent (based on the total weight of the resulting composition) of polytetrahydrofuran (PTHF 2000, BASF), 0.5 weight percent of 1,1,1-trimethylolpropane (TMP; Fluka) and 0.6 weight percent of a dibutyltin mercaptide catalyst (METATIN™ T-713 available from Acima) are mixed at 85° C. to homogeneity. Then, 13.5 weight percent of hexamethylene-1,6-diisocyanate (HDI; Bayer/Merck) is added and the mixture is allowed to react at 85° C. for 1 hour. In reaction step b), 6.1 percent of diisopropylamine (Merck) is added and the mixture is stirred for additional 20 minutes at 85° C. In reaction step c), 4.7 weight percent of o,o'-diallylbisphenol A (Huntsman Corporation) is added and the mixture is stirred for additional 20 minutes. Thereby, a compound of Formula I capped with both diisopropylamine (80 val percent) and o,o'-diallylbisphenol A (20 val percent) is obtained (Example 8).

9. Preparation of a Cyclohexylamine-Capped Compound According to Formula I

In reaction step a), 77.2 weight percent (based on the total weight of the resulting composition) of polytetrahydrofuran (PTHF 2000, BASF), 0.5 weight percent of 1,1,1-trimethylolpropane (TMP; Fluka) and 0.6 weight percent of a dibutyltin mercaptide catalyst (METATIN™ T-713 available from Acima) are mixed at 85° C. to homogeneity. Then, 14.0 weight percent of hexamethylene-1,6-diisocyanate (HDI; Bayer/Merck) is added and the mixture is allowed to react at 85° C. for 1 hour. In reaction step b) 7.7 weight percent cyclohexylamine (Merck) is added and the mixture is stirred for additional 20 minutes at 85° C. Thereby, a cyclohexylamine-capped compound according to Formula I is obtained (Example 9).

10. Preparation of an n-octylamine-Capped Compound According to Formula I

In reaction step a), 75.4 weight percent (based on the total weight of the resulting composition) of polytetrahydrofuran (PTHF 2000, BASF), 0.5 weight percent of 1,1,1-trimethylolpropane (TMP; Fluka) and 0.6 weight percent of a dibutyltin mercaptide catalyst (METATIN™ T-713 available from Acima) are mixed at 85° C. to homogeneity. Then, 13.7 weight percent of hexamethylene-1,6-diisocyanate (HDI; Bayer/Merck) is added and the mixture is allowed to react at 85° C. for 1 hour. In reaction step b), 9.8 weight percent n-octylamine (Fluka) is added and the mixture is stirred for additional 20 minutes at 85° C. Thereby, an n-octylamine-capped compound according to Formula I is obtained (Example 10).

11. Preparation of a Diisopropylamine-Capped Compound According to Formula I Based on a Polyester Diol-Containing Prepolymer In reaction step a), 27.9 weight percent (based on the total weight of the resulting composition) of polytetrahydrofuran (PTHF 2000, BASF), 51.4 weight percent of a polyester diol (DYNACOLL™ 7380 available from Degussa), 0.4 weight percent of 1,1,1-trimethylolpropane (TMP; Fluka) and 0.4 weight percent of a dibutyltin mercaptide catalyst (METATIN™ T-713 available from Acima) are mixed at 85° C. to homogeneity. Then, 12.0 weight percent of hexamethylene-1,6-diisocyanate (HDI; Bayer/Merck) is added and the mixture is allowed to react at 85° C. for 1 hour. In reaction step b), 7.9 weight percent of diisopropylamine (Merck) is added and the mixture is stirred for additional 20 minutes at 85° C. A diisopropylamine-capped compound according to formula I based on a polyester diol-containing prepolymer is obtained (Example 11).

12. Preparation of a Diisopropylamine-Capped Compound According to Formula I Based on a Polyester Diol-Containing Prepolymer In reaction step a), 64.6 weight percent (based on the total weight of the resulting composition) of polytetrahydrofuran (PTHF 2000, BASF), 13.2 weight percent of a polyester diol (DYNACOLL™ 7380 available from Degussa), 0.5 weight percent of 1,1,1-trimethylolpropane (TMP; Fluka) and 0.5 weight percent of a dibutyltin mercaptide catalyst (META-TIN™ T-713 available from Acima) are mixed at 85° C. to homogeneity. Then, 13.4 weight percent of hexamethylene-1,6-diisocyanate (HDI; Bayer/Merck) is added and the mixture is allowed to react at 85° C. for 1 hour. In reaction step b), 7.8 weight percent of diisopropylamine (Merck) is added and the mixture is stirred for additional 20 minutes at 85° C. A diisopropylamine-capped compound according to Formula I based on a polyester diol-containing prepolymer is obtained (Example 12). This prepolymer on which the compound is based contains less polyester diol than the one of Example 11 (Example 12).

13. Preparation of a Diisopropylamine-Capped Toughener According to Formula I Based on a Polyurea Prepolymer In reaction step a), 76.7 weight percent (based on the total weight of the resulting composition) of a polyoxypropylene-diamine (JEFFAMINE™ D 2000 available from Huntsman Corporation) and 1.9 weight percent of a polyoxypropylenetriamine (JEFFAMINE™ T 403 available from Huntsman Corporation) are mixed under cooling to homogeneity. Then, 13.7 weight percent of hexamethylene-1,6-diisocyanate (HDI; Bayer/Merck) is added and the mixture is allowed to react under cooling for 10 minutes. In reaction step b), 7.8 weight percent of diisopropylamine (Merck) is added and the mixture is stirred for additional 10 minutes at 85° C. Thereby, a diisopropylamine-capped compound according to Formula I based on a polyurea prepolymer is obtained (Example 13).

In analogy to Examples 1 to 3, Examples 14 to 22 are prepared by adding in step b) the corresponding compounds given below:
Example 14: dibutylamine,
Example 15: dipropylamine,
Example 16: ditridecylamine,
Example 17: dibenzylamine,
Example 18: diallylamine,
Example 19: ethylcyclohexylamine,
Example 20: N-methylacetamide,
Example 21: morpholine, and
Example 22: 1-butanethiol.

All mixing steps in the above preparation processes are performed under nitrogen. After reaction step a), the NCO content is measured by back-titration with HCl solution after reacting the polyisocyanate with an excess of dibutylamine. The number average molecular weight (Mn) of the obtained compounds is determined by gel permeation chromatography chromatography as described above (first column: PL Gel 3 μm Mixed E; second column: PL Gel 5 μm Mixed D; both available from Polymer Laboratories; flow: 0.9 ml/min THF; standard: polystyrene). The results are given in Table 1. As a reference example, the result for FLEXIBILIZER™ DY 965, i.e. a toughener corresponding to Example 13 of EP-B-0 308 664, is also given.

TABLE 1

| Toughener | NCO content after reaction step a) [percent] | Mn (main peak) |
| --- | --- | --- |
| DY ™ 965 reference |  | 36800 |
| Example 1 | 3.3 | 29400 |
| Example 2 | 3.4 | 33600 |
| Example 3 | 3.0 | 32100 |
| Example 4 | 3.1 | 24700 |
| Example 14 | 3.2 | 31000 |
| Example 15 | 3.3 | 31000 |
| Example 16 | 3.1 | 29400 |
| Example 17 | 3.1 | 31400 |
| Example 18 | 3.0 | 32700 |
| Example 19 | 3.5 | 36400 |
| Example 20 | 3.0 | 33600 |
| Example 21 | 3.1 | 36600 |
| Example 22 | 3.1 | 32900 |

Toughening Effect of Compounds According to Formula I

For each of Examples 1 to 22, a heat curable composition comprising 14 weight percent of the respective toughening compound of the present invention, 55 weight percent of a mixture of epoxy resins D.E.R™ 330 liquid epoxy resin and D.E.R™ 671 solid epoxy resin (ration of 1.7:1 liquid to solid epoxy resin) (both available from The Dow Chemical Company), 15 weight percent of an acrylonitrile-butadiene rubber, 4.5 weight percent of dicyandiamide, 1 weight percent of accelerator EP 796, about 5 weight percent of fumed silica and about 5 weight percent of polyvinylbutyral has been prepared. As a comparative example, an analog composition comprising FLEXIBILIZER™ DY 965 has been prepared.

A sample of each of the thus prepared heat curable compositions is cured at a temperature of 180° C. for 30 minutes. The lap shear strength and the impact peel strength of the cured product is determined by the following methods. The lap shear strength was determined at 23° C. according to DIN EN 1465 using degreased cold-rolled steel (CRS 1403, 1.5 mm thick) as substrate. The bonding area was 25 mm×10 mm, the adhesive layer thickness was 0.2 mm. The test speed was 10 mm/min. The impact peel strength was determined at 23° C. according to ISO 11343 using a degreased cold-rolled steel (CRS 1403, 1 mm thick) as substrate. The bonding area was 30 mm×20 mm, the adhesive layer thickness was 0.2 mm. The test speed was 2 m/s. The results are shown in Table 2. The corresponding values of the heat curable composition comprising FLEXIBILIZER™ DY 965 (RAM™ 965) toughener is given as a reference example.

TABLE 2

| adhesive with following compound: | lap shear strength [MPa] | impact peel strength [N/mm] | terminating compound | pre-polymer |
| --- | --- | --- | --- | --- |
| Example 1 | 31 | 55 | dicylohexylamine |  |
| Example 2 | 31 | 63 | diisopropylamine |  |
| Example 3 | 31 | 57 | 1-dodecanethiol |  |

TABLE 2-continued

| adhesive with following compound: | lap shear strength [MPa] | impact peel strength [N/mm] | terminating compound | pre-polymer |
|---|---|---|---|---|
| Example 4 | 25 | 29 | dicyclohexylamine and o-allylphenol; 80 valpercent:20 valpercent | |
| Example 5 | 27 | 52 | diisopropylamine and o-allylphenol; 80 valpercent:20 valpercent | |
| Example 6 | 28 | 49 | 1-dodecanthiol and o-allylphenol; 80 valpercent:20 val percent | |
| Example 7 | 28 | 46 | diisopropylamine | containing polybutadiene diol |
| Example 8 | 31 | 53 | diisopropylamine and o,o'-diallylbisphenol A; 80 valpercent:20 val percent | |
| Example 9 | 22 | 25 | cyclohexylamine | |
| Example 10 | 23 | 17 | n-octylamine | |
| Example 11 | 27 | 14 | diisopropylamine | containing polyester diol |
| Example 12 | 28 | 49 | diisopropylamine | containing polyester diol |
| Example 13 | 28 | 10 | diisopropylamine | polyurea |
| Example 14 | 29 | 53 | dibutylamine | |
| Example 15 | 29 | 52 | dipropylamine | |
| Example 16 | 28 | 40 | ditridecylamine | |
| Example 17 | 26 | 29 | dibenzylamine | |
| Example 18 | 27 | 46 | diallylamine | |
| Example 19 | 29 | 57 | ethylcyclohexyl-amine | |
| Example 20 | 26 | 34 | N-methylacetamide | |
| Example 21 | 29 | 53 | morpholine | |
| Example 22 | 29 | 53 | 1-butanethiol | odor |
| DY 965 (reference) | 34 | 48 | o,o'-diallyl bisphenol A | |

Particularly good results in respect of both the lap shear strength and the impact peel strength are obtained when the capping compound (i.e. residue X in Formula I) is a sterically hindered secondary amine, such as dicyclohexylamine and diisopropylamine, or a combination of such an amine with o-allylphenol or o,o'diallylbisphenol A. Also, good results are obtained when the capping compound is a thiol such as 1-dodecanethiol. Compounds in which the capping compound is a mixture of dicyclohexylamine and o-allylphenol or o,o'-diallyl bisphenol A, a mixture of diisopropylamine and o-allylphenol or o,o'-diallyl bisphenol A or a mixture of a 1-dodecanethiol and o-allylphenol or o,o'-diallyl bisphenol A are also preferred.

Lap Shear Strength on Different Metals Treated with Different Oils

For Examples 1 to 3, the lap shear strengths at 23° C. according to DIN EN 1465 (bonding area: 25 mm×10 mm; adhesive layer thickness: 0.2 mm) of the corresponding formulations were determined on different metals treated with different oils. As substrates, H340LAD+Z (hot-dipped zinc coated, 0.7 mm thick), DC04-B+ZE (electrogalvanized zinc coated, 0.8 mm thick) and AA6016 (Aluminum, 1.2 mm thick, pretreated using ALODINE™ 2040 were used. The oils used in the tests were AP™ 167/22 (available from Pfinder) and ANTICORT™ 4107S) (available from Fuchs). The test speed was 10 mm/min. The results are shown in Table 3. The values are given in MPa.

TABLE 3

| | adhesive with toughener: | | | | |
|---|---|---|---|---|---|
| | H340LAD + Z AP 167/22 | H340LAD + Z ANTICORIT ™ 4107S | DC04-B + ZE AP 167/22 | DC04-B + ZE ANTICORIT ™ 4107S | AA 6016 |
| DY ™ 965 | 30 | 30 | 20 | 20 | 26 |
| Example 1 | 30 | 30 | 20.2 | 20.8 | 24.8 |
| Example 2 | 28.4 | 28.6 | 20.3 | 20.8 | 25 |
| Example 3 | 27.2 | 30 | 20.3 | 20 | 23 |

Impact Peel Strength on Different Metals and Oils

For Examples 1 to 3, the impact peel strengths of the corresponding formulations were determined at 23° C. according to ISO 11343 on different metals and oils (bonding area: 30 mm×20 mm, adhesive layer thickness: 0.2 mm, test speed: 2 m/s). As substrates, H340LAD+Z (0.7 mm thick), DC04-B+ZE (0.8 mm thick) and AA6016 (Aluminum, 1.2 mm thick, pretreated using ALODINE™ 2040 were used. The oils used in the tests were AP 167/22 (available from Pfender) and ANTICORIT 4107S available from Fuchs). The results are shown in Table 4. The values are given in N/mm.

TABLE 4

| | adhesive with toughener: | | | | |
|---|---|---|---|---|---|
| | H340LAD + Z AP 167/22 | H340LAD + Z ANTICORIT ™ 4107S | DC04-B + ZE AP 167/22 | DC04-B + ZE ANTICORIT ™ 4107S | AA 6016 |
| DY ™ 965 reference | 40 | 39 | 43 | 40 | 38 |
| Example 1 | 50 | 47 | 49 | 48 | 40 |
| Example 2 | 44 | 47 | 48 | 48 | 36 |
| Example 3 | 46 | 49 | 41 | 46 | 39 |

As can be seen from Table 4, the formulations comprising a compound of the present invention have generally higher impact peel strengths than the formulation comprising the reference FLEXIBILIZER™ DY 965 toughener.

Impact Peel Strength at Low Temperature

In a further test, the impact peel strength of the structural adhesive composition comprising the compound of Example 7 has been determined according to ISO 11343 at room temperature and at −40° C. (bonding area: 30×20 mm, adhesive layer thickness: 0.2 mm, test speed: 2 m/s, substrate: cold-rolled steel, thickness 1 mm). As a reference example, the values of the adhesive composition comprising reference FLEXIBILIZER™ DY 965 toughener are also given. The results are shown in Table 5. The values are given in N/mm.

TABLE 5

| temperature | composition comprising FLEXIBILIZER ™ DY 965 toughener | composition comprising compound acc. to Example 7 |
|---|---|---|
| room temperature | 42 | 49 |
| −40° C. | 35 | 39 |

Table 5 shows superior impact peel strength of the structural adhesive composition of the present invention over the structural adhesive composition comprising the reference toughener.

The invention claimed is:

1. A curable epoxy composition comprising:
a) 30 to 80 percent by weight of an epoxy resin;
b) 5 to 40 percent by weight of a compound comprising an elastomeric prepolymer residue selected from the group of a polyurethane, a polyurea and a polyurea polyurethane having isocyanate end groups, the isocyanate end groups of said prepolymer residue being capped by a monofunctional capping compound selected from the group consisting of secondary aliphatic amines, secondary cycloaliphatic amines, secondary aromatic amines, secondary heteroaromatic amines, secondary araliphatic amines, thiols, alkyl amides, and mixtures thereof, wherein the capping compound is bound to the end of the polymer chain of the elastomeric prepolymer in a manner such that the end to which it is bonded no longer has a reactive group;
c) 5 to 30 percent by weight of a core shell rubber, a second epoxy resin modified with a copolymer based on a 1,3-diene and a polar, ethylenically unsaturated comonomer or a mixture thereof; and
d) 1 to 10 percent by weight of a hardener.

2. A curable epoxy composition according to claim 1 wherein the capped elastomeric prepolymer corresponds to the structure of the formula

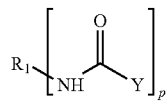

wherein R$_1$ is the elastomeric prepolymer residue, said residue having a valence of 2 to 6 with p=2 to 6,
Y is the residue of the secondary aliphatic, secondary cycloaliphatic amine, secondary aromatic amine, secondary heteroaromatic amine, secondary araliphatic amine, thiol and/or alkyl amide;
said compound being soluble or dispersible in an epoxy resin.

3. A curable epoxy resin composition according to claim 1 wherein the capped elastomeric prepolymer is obtainable by reacting a polyether polyol and/or a polyether polyamine with an excess of a polyisocyanate.

4. A curable epoxy resin composition according to claim 3 wherein during the reaction to obtain the capped elastomeric prepolymer additionally a polyester diol, a polybutadiene diol and/or a short-chain polyol is co-reacted.

5. A curable epoxy composition according to claim 1 wherein the secondary amine is dicyclohexylamine and/or diisopropylamine.

6. A curable epoxy composition according to claim 1 wherein the thiol is 1-dodecanethiol.

7. A curable epoxy composition according to claim 1 comprising
a) 40 to 70 weight percent of epoxy resin;
b) about 8 weight percent to about 30 weight percent of the capped elastomeric prepolymer;
c) about 10 weight percent to about 20 weight percent of the core shell rubber, a second epoxy resin modified with a copolymer based on a 1,3-diene and polar, ethylenically unsaturated comonomer or mixture thereof; and
d) about 2 to about 7 weight percent of hardener.

8. A curable epoxy composition according to claim 1 further comprising one or more additives selected from the group of hardeners, accelerators, adhesion promoters, epoxy silane, fumed silica, wetting agents and inorganic fillers.

9. A curable epoxy composition according to claim 1 further comprising a thermoplastic polymer comprising a polyester segment, said polymer being at least partially crystalline at room temperature and having a softening temperature in the range of 40° to 125°C.

10. A curable epoxy composition according to claim 1 further comprising as an accelerator 2,4,6-tris(dimethylaminomethyl)phenol integrated into a poly(p-vinylphenol) matrix.

11. A process of bonding together separate surfaces wherein the curable epoxy composition according to claim 1 is applied to at least one surface, the surfaces are brought together and the epoxy composition is cured at a temperature of 120° C. to 210°C.

12. A curable epoxy composition according to claim 1 wherein the epoxy resin has the residue of bisphenol moieties in the backbone.

13. A curable epoxy composition according to claim 12 wherein the epoxy resin comprises a mixture of liquid and solid resins wherein the solid epoxy resin comprises about 40 percent by weight or less of the epoxy resin mixture.

14. A curable epoxy composition according to claim 12 wherein the isocyanate used to prepare the elastomeric prepolymer is an aliphatic polyisocyanate.

15. A curable epoxy composition according to claim 1 wherein the elastomeric prepolymer residue is derived from the reaction of a polyether polyol and a polyisocyanate wherein the polyether polyol comprises a polytetrahydrofuran or a polypropylene oxide and the isocyanate is an aliphatic polyisocyanate.

16. A curable epoxy compound according to claim 15 wherein the capping compound is dicyclohexylamine and/or diisopropylamine.

17. A curable epoxy composition comprising:
a) an epoxy resin;
b) a compound comprising an elastomeric prepolymer residue selected from the group of a polyurethane, a polyurea and a polyurea polyurethane having isocyanate end groups, the isocyanate end groups of said prepolymer residue being capped by a mixture of monofunctional capping compounds the first selected from the group consisting of secondary aliphatic amines, secondary cycloaliphatic amines, secondary aromatic amines, secondary heteroaromatic amines, secondary araliphatic amines, thiols, alkyl amides, and mixtures thereof, and the second selected from monofunctional phenols wherein the capping compound is bound to the end of the polymer chain of the elastomeric prepolymer in a manner such that the end to which it is bonded no longer has a reactive group;
c) a core shell rubber, a second epoxy resin modified with a copolymer based on a 1,3-diene and a polar, ethylenically unsaturated comonomer or a mixture thereof; and
d) a hardener.

18. A curable epoxy composition according to claim 17 wherein capped elastomeric prepolymer corresponds to the structure of Formula I

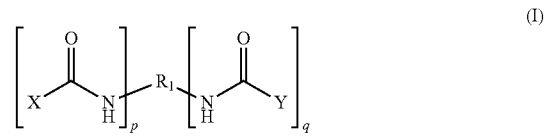

wherein R1 is the elastomeric prepolymer residue, said residue having a valence of p+q=2 to 6 with p=1 to 6 and q is greater than 0 to 5, X is the residue of the secondary aliphatic amine, secondary cycloaliphatic amine, secondary aromatic amine, secondary heteroaromatic amine, secondary araliphatic amine the thiol and/or the alkyl amide and Y is the residue of the phenol;

said compound being soluble or dispersible in an epoxy resin.

* * * * *